W. W. SNYDER.
FLUE DITCHER.
No. 189,667. Patented April 17, 1877.
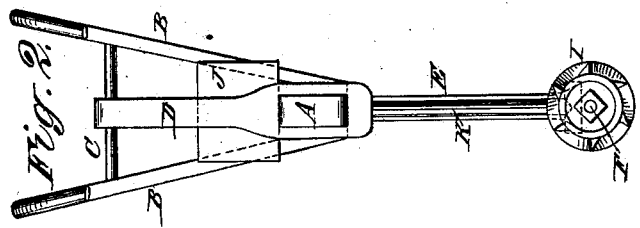
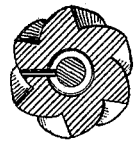
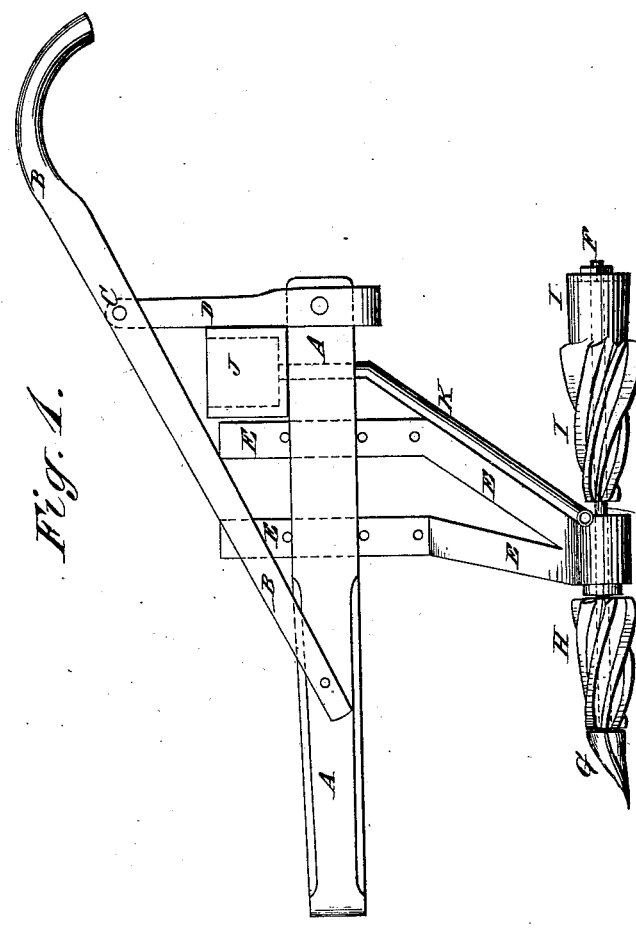
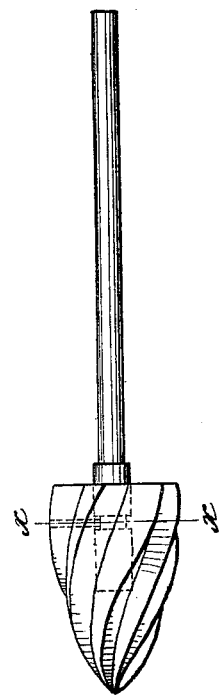
WITNESSES:
H. Rydquist
J. H. Scarborough
INVENTOR:
W. W. Snyder.
BY
ATTORNEYS.

UNITED STATES PATENT OFFICE.

WARREN W. SNYDER, OF MARTINSVILLE, OHIO.

IMPROVEMENT IN FLUE-DITCHERS.

Specification forming part of Letters Patent No. 189,667, dated April 17, 1877; application filed February 3, 1877.

*To all whom it may concern:*

Be it known that I, WARREN WALKER SNYDER, of Martinsville, in the county of Clinton and State of Ohio, have invented a new and useful Improvement in Flue-Ditcher, of which the following is a specification:

Figure 1 is a side view of my improved machine. Fig. 2 is a rear view of the same. Fig. 3 is a detail view, showing a modification of the forward cutter. Fig. 4 is a cross-section of the same, taken through the line $x\ x$, Fig. 3.

Similar letters of reference indicate corresponding parts.

The object of this invention is to furnish an improved machine for opening underground flues for draining land, which shall be simple in construction, of light draft, and effective in operation.

The invention consists in the combination of the adjustable branched standard, the rod, the point or cutter, the rotating spirally-corrugated or ribbed cutter, and the rotating cutter and packer, having its forward part spirally corrugated or ribbed, and its rear part smooth, with the beam, the handles, and the upright; in the combination of the adjustable branched standard, the rod, the rotating spirally corrugated or ribbed cutter, and the rotating cutter and packer, having its forward part spirally corrugated or ribbed, and its rear part smooth, with the beam, the handles, and the upright, as hereinafter fully described.

A represents the beam, to the forward end of which the draft is applied, and to the middle part of which the forward end of the handles B are attached. The rear part of the handles B are attached to the ends of a round, C, the middle part of which passes through, and is secured to, the upper end of the upright D. The lower end of the upright D is secured to the rear end of the beam A. E is the standard, which is branched so that the parts may brace each other. The standard E is made with an angle, so that its upper part may be vertical, while its lower part inclines forward.

The upper parts of the arms or branches of the standard E pass up through mortises in the beam A, and have a number of holes formed through them to receive pins, so that the machine may be adjusted to work at any desired depth in the ground. Upon the lower end of the branched standard E is formed a cylindrical head or socket, through which passes a rod, F. To the forward end of the rod F is securely attached a cutter, G, which is made with wings or cutting-edges upon its sides and top, so that it may be drawn easily through the ground. The rear end of the cutter G is recessed to receive the forward end of the cutter H, which is placed upon the rod F between the cutter or point G and the standard E. The cutter H is made slightly conical in form and with spiral corrugations or ribs upon its sides, which ribs make about one-third of a turn, and are made with sharp edges, so that it may cut the soil and press it upward and sidewise as it is revolved by the pressure of the soil. Upon the rod F in the rear of the standard E is placed the cutter and packer I, which is secured in place by a nut screwed upon the rear end of the said rod F. The forward part of the cutter I, for a little more than half its length is made slightly conical, and is corrugated or ribbed spirally, so as to cut the soil and press it upward and sidewise. The rear part of the cutter and packer I is made cylindrical or slightly conical and smooth, so as to pack the soil and thus form a flue.

To the rear end of the beam A is attached a water-box, J, from the bottom of which a small tube, K, passes down along the rear edge of the standard E, and terminates in a sprinkler at the forward end of the cutter and packer I, to moisten the soil, so as to form an arch or tile out of the soil itself as it is worked and packed by the action of the cutter and packer I.

For some soils it may be advisable to omit the point G. In this case the cutter H is extended to a point, and its spiral corrugations or ribs are extended to or nearly to said point.

The forward end of the rod F is inserted in a hole formed in the rear end of the cutter H, and extending about three-fourths the length of the said cutter, where it is secured in place by a pin passing through the cutter H, and through a ring-groove formed around the rod F, as shown in Figs. 3 and 4.

Having thus described my invention, I claim as new and desire to secure by Letters Patent—

1. The combination of the adjustable branched standard E, the rod F, the point or cutter G, the rotating spirally corrugated or ribbed cutter H, and the rotating cutter and packer I, having its forward part spirally corrugated or ribbed and its rear part smooth, with the beam A, handles B, and upright D, substantially as herein shown and described.

2. The combination of the adjustable branched standard E, the rod F, the rotating spirally corrugated or ribbed cutter H, and the rotating cutter and packer I, having its forward part spirally corrugated or ribbed, and its rear part smooth, with the beam A, the handles B, and the upright D, substantially as herein shown and described.

WARREN WALKER SNYDER.

Witnesses:
L. J. WALKER,
EDWIN DE VOIS.